(12) United States Patent
Bang

(10) Patent No.: US 11,781,622 B2
(45) Date of Patent: Oct. 10, 2023

(54) MECHANICAL CHAIN TENSIONER

(71) Applicants: Hyundai Motor Company, Seoul (KR); Kia Corporation, Seoul (KR)

(72) Inventor: Sang Hyun Bang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/835,560

(22) Filed: Jun. 8, 2022

(65) Prior Publication Data
US 2022/0412452 A1 Dec. 29, 2022

(30) Foreign Application Priority Data
Jun. 24, 2021 (KR) .......................... 10-2021-0081966

(51) Int. Cl.
*F16H 7/08* (2006.01)
*F16H 7/18* (2006.01)
*F02B 67/06* (2006.01)

(52) U.S. Cl.
CPC ................. *F16H 7/08* (2013.01); *F16H 7/18* (2013.01); *F02B 67/06* (2013.01); *F16H 2007/0842* (2013.01); *F16H 2007/0872* (2013.01); *F16H 2007/0893* (2013.01); *F16H 2007/185* (2013.01)

(58) Field of Classification Search
CPC ..... F16H 7/02; F16H 7/06; F16H 7/08; F16H 2007/0842; F16H 2007/0844; F16H 2007/0872; F16H 7/18; F16H 2007/185; F16H 2007/0893; F16H 57/043; F16H 57/045; F16H 57/0423; F16H 57/0489; F16H 57/0842; F02B 67/00; F02B 67/04; F02B 67/06
See application file for complete search history.

(56) References Cited

U.S. PATENT DOCUMENTS

| | | | | |
|---|---|---|---|---|
| 5,647,811 A | * | 7/1997 | Mott | F16H 7/0848 474/111 |
| 5,868,638 A | * | 2/1999 | Inoue | F16H 7/0848 474/140 |
| 6,743,130 B2 | * | 6/2004 | Konno | F16H 7/18 474/111 |
| 7,942,769 B2 | * | 5/2011 | Pflug | F16H 7/18 474/111 |

(Continued)

FOREIGN PATENT DOCUMENTS

| | | | | |
|---|---|---|---|---|
| DE | 10014325 A1 | * | 10/2001 | ............... F16H 7/08 |
| DE | 102018130733 A1 | * | 5/2020 | ............. F02B 67/06 |

(Continued)

*Primary Examiner* — Michael R Mansen
*Assistant Examiner* — Raveen J Dias
(74) *Attorney, Agent, or Firm* — MORGAN, LEWIS & BOCKIUS LLP

(57) ABSTRACT

A chain tensioner transmits power of a crankshaft provided in an engine to peripheral auxiliary devices and guides a chain belt that transfers engine oil. The chain tensioner includes a body portion that tensions the chain belt through a pivot, the upper surface of the body portion includes an oil guiding rib that collects the engine oil scattered from the chain belt to the upper part, one surface of the body portion in contact with the upper surface includes a pivot journal, and one surface of the body portion includes a first oil flow path that guides the engine oil to flow down to the pivot journal.

18 Claims, 7 Drawing Sheets

(56) References Cited

U.S. PATENT DOCUMENTS

| | | | |
|---|---|---|---|
| 8,696,500 B2 * | 4/2014 | Hirayama | F16H 7/18 |
| | | | 474/111 |
| 9,835,232 B2 * | 12/2017 | Geibel | F16H 7/08 |
| 10,451,175 B2 * | 10/2019 | Mishima | F16H 57/0456 |
| 11,248,682 B2 * | 2/2022 | Hashimoto | F16H 7/18 |
| 2002/0170525 A1 * | 11/2002 | Iizuka | F01L 1/053 |
| | | | 123/196 R |
| 2003/0064842 A1 * | 4/2003 | Konno | F16H 7/18 |
| | | | 474/140 |
| 2009/0036241 A1 * | 2/2009 | Hirayama | F16H 7/18 |
| | | | 474/111 |
| 2009/0325748 A1 * | 12/2009 | Pflug | F16H 7/18 |
| | | | 474/91 |
| 2013/0090201 A1 * | 4/2013 | Mori | F16H 7/18 |
| | | | 474/140 |
| 2013/0210566 A1 * | 8/2013 | Konno | F16H 7/18 |
| | | | 474/111 |
| 2015/0204218 A1 * | 7/2015 | Utaki | F01M 9/10 |
| | | | 474/140 |
| 2016/0223053 A1 * | 8/2016 | Rampp | F16G 13/06 |
| 2017/0037956 A1 * | 2/2017 | Mishima | F01M 1/06 |
| 2017/0248205 A1 * | 8/2017 | Moster | F16H 7/08 |
| 2018/0252301 A1 * | 9/2018 | Konno | F16H 57/05 |
| 2020/0362944 A1 * | 11/2020 | Hashimoto | F16H 7/18 |
| 2021/0285537 A1 * | 9/2021 | Shimosaka | F16N 7/24 |

FOREIGN PATENT DOCUMENTS

| | | | | |
|---|---|---|---|---|
| JP | 2001349400 A | * | 12/2001 | F16H 2007/0872 |
| JP | 3350612 B2 | * | 11/2002 | F01M 9/108 |
| KR | 20060069898 A | * | 6/2006 | F16H 7/08 |
| WO | WO-2020187351 A1 | * | 9/2020 | F16H 7/18 |

\* cited by examiner

MECHANICAL CHAIN TENSIONER

CROSS-REFERENCE TO RELATED APPLICATION

The present application claims priority to Korean Patent Application No. 10-2021-0081966 filed on Jun. 24, 2021, the entire contents of which is incorporated herein for all purposes by this reference.

BACKGROUND OF THE PRESENT DISCLOSURE

Field of the Present Disclosure

The present disclosure relates to a mechanical chain tensioner apparatus, and more particularly, to a mechanical chain tensioner apparatus of a hydraulic pump used in a vehicle engine that can improve uneven wear and wear of a pivot journal part.

Description of Related Art

Engine oil flows inside a vehicle's engine and performs various roles such as a friction reduction between engine components, cooling, sealing, dispersing of a chain stress, and cleaning. Among them, the biggest purpose of the engine oil is a lubrication action to prevent wear caused by a collision between the parts. Users may generally inject the engine oil into the engine by opening an oil pillar cap positioned on a cylinder head cover. The engine oil flowing through the oil passage inside the oil pillar cap is collected in an oil pan positioned at the bottom portion of the engine, is pumped by a hydraulic pump, and then is supplied to various parts constituting the engine such as a crankshaft and a cylinder head through other oil passages.

At the present time, the hydraulic pump is connected to the crankshaft through a chain, and a chain tensioner presses the chain. The chain tensioner is an automatic adjustment device for applying pressure to the chain. As an example, the chain tensioner is provided and used in a chain belt drive system including the crankshaft. The chain tensioner is provided between the crankshaft and peripheral auxiliary equipment and is configured to continuously apply a tension to the chain to prevent driving timing of the chain from changing as the chain, which is a connecting medium between two components, becomes loose.

A conventional chain tensioner is a mechanical chain tensioner for maintaining the tension to the chain, and consists of a body that can guide the chain, a torsion spring that allows a constant tension to be applied to the chain by rotating the body, and a central axis that can rotate the body. Here, the rotation means a pivot, and the types of the central axis may be various, and a crankshaft may correspond to this as a representative example.

The central axis receives repeated loads by an external force and a vibration applied from the chain, and also has a structure that continuously receives the friction due to a certain amount of rotation motion according to the behavior of the chain. In the case of the central axis where the load is repeatedly applied and rotation occurs, oil supply must be made to reduce the friction and reduce the wear. In the case of the conventional art, the central axis is passively lubricated only with oil mist dispersed by the rotation of the crankshaft without a separate oil supply structure.

Recently, a viscosity of the engine oil has been continuously lowered for enhancement of fuel efficiency, and furthermore, bad conditions in lubrication aspects are continuing, with many occurrences of lowering the engine oil viscosity due to various driving conditions, temperature, and fuel properties. In these conditions, wear resistance tends appear mainly in the rotation. Therefore, the lubrication of the central axis with only the oil mist may be insufficient, and accordingly, the need to strengthen the lubrication for the rotation of the mechanical chain tensioner is emerging.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mechanical chain tensioner apparatus with improved wear resistance through reinforcement of the lubrication of the rotation axis.

A chain tensioner apparatus according to various exemplary embodiments of the present disclosure transmits power of a crankshaft provided in an engine to peripheral auxiliary devices and guides a chain belt that transports engine oil, wherein the chain tensioner apparatus includes: a body portion including an upper surface of which at least a part is in contact with the chain belt to apply a tension to the chain belt and first and second side surfaces connected to the upper surface and facing each other; a pivot journal penetrating the first and second side surfaces of the body portion; and a bolt penetrating the pivot journal to pivot the body portion with respect to the engine, at least a part of the engine oil transported by the chain belt is scattered on the upper surface of the body portion, and at least one of the side surfaces is formed with a first oil flow path that guides the engine oil scattered on the upper surface of the body portion to the pivot journal.

An oil guiding rib that collects the at least a part of the engine oil scattered from the chain belt to the upper surface may be protruded upward on the upper surface of the body portion.

An oil collecting portion that surrounds a lower part of the pivot journal and re-collects the engine oil may be formed on the side surface where the first oil flow path is formed.

The bolt may include: a screw thread which is engaged with the engine; at least one contact portion in contact with an inside of the pivot journal when penetrating the pivot journal; and a head portion protruded outward in a radial direction of the pivot journal and having at least a part surrounded by the oil collecting portion.

A chamber for storing the re-collected engine oil may be formed in the oil collecting portion.

The oil guiding rib may be provided on at least one end portion of the upper surface of the body portion.

The oil guiding rib may include a first oil guiding rib and a second oil guiding rib spaced from each other at one end portion of the upper surface of the body portion.

The starting point of the first oil flow path may be formed between the first oil guiding rib and the second oil guiding rib.

At least one of opposite surfaces of the first oil guiding rib and the second oil guiding rib may be formed to be inclined toward the first oil flow path.

A journal rib may be formed on the circumference of the pivot journal, and a rib groove fluidly connected to the first oil flow path may be formed in the journal rib.

An oil supply rib that facilitates the flow of the engine oil may be formed on one surface of at least one among the plurality of oil guiding ribs.

The oil supply rib may be fluidly connected to the oil collecting portion.

A second oil flow path guiding the engine oil to the first oil flow path may be formed on the upper surface of the body portion, and the second oil flow path may be fluidly connected to the first oil flow path.

The second oil flow path may be formed with a slanted surface facing the first oil flow path.

The second oil flow path may include: a first groove guiding the flow of the engine oil to the first oil flow path; and a second groove which is fluidly connected to the first groove and induces the flow of engine oil into the first groove.

The second groove may form a lower step than a top surface of the body portion, and the first groove may form a lower step than the second groove.

The first groove may be formed with a slanted surface facing the first oil flow path, and the second groove may be formed with a slanted surface facing the first groove.

According to various exemplary embodiments of the present disclosure, by improving the lubrication properties of the part where the arm bolt engages in the mechanical chain tensioner apparatus, the friction may be reduced and the wear may be improved. Therefore, the chain tensioner apparatus may be used continuously for a long time without replacement or repair.

Furthermore, effects that can be obtained or expected from embodiments of the present disclosure are directly or suggestively described in the following detailed description. That is, various effects expected from embodiments of the present disclosure will be described in the following detailed description.

The methods and apparatuses of the present disclosure have other features and advantages which will be apparent from or are set forth in more detail in the accompanying drawings, which are incorporated herein, and the following Detailed Description, which together serve to explain predetermined principles of the present disclosure.

Figure 1:
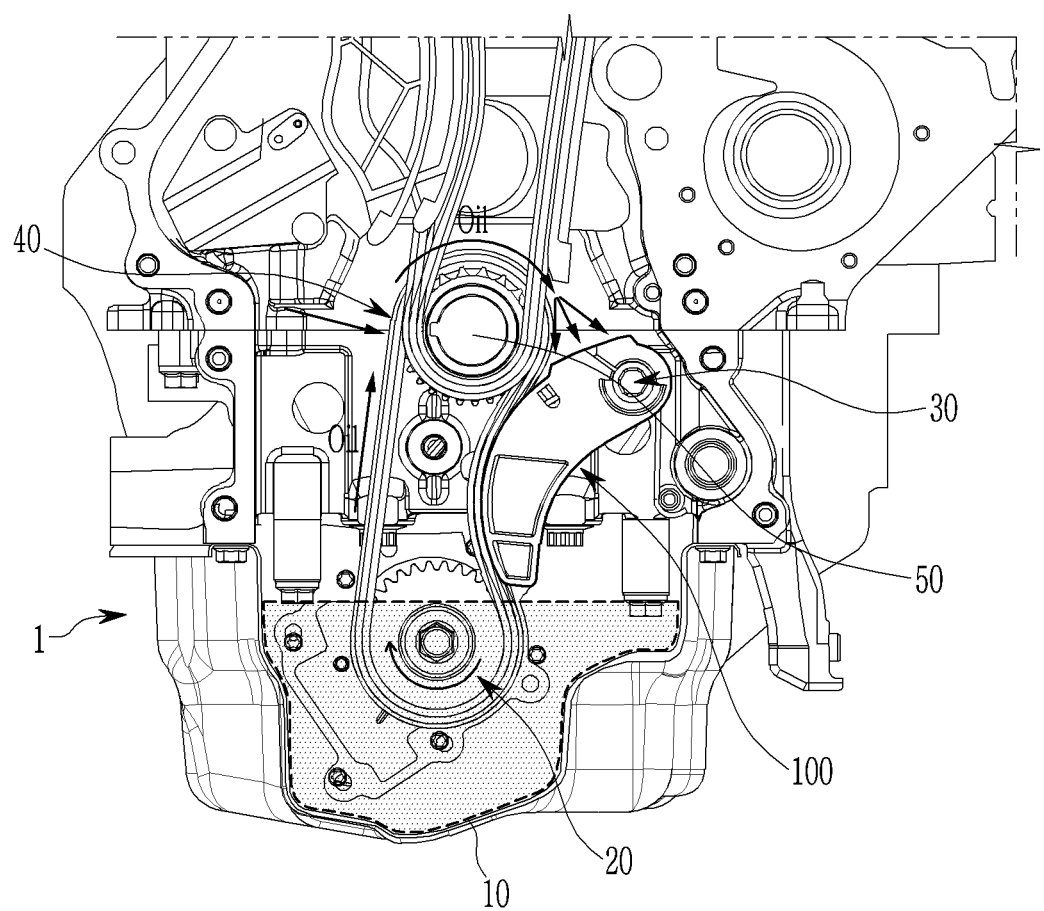
FIG. 1 is a view showing inside of an engine to which a chain tensioner according to various exemplary embodiments of the present disclosure is applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The terminology used herein is for describing various exemplary embodiments only, and is not intended to limit the present disclosure. As used herein, singular forms are intended to also include a plurality of forms, unless the context clearly indicates otherwise. It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof. Also, as used herein, the term "and/or" includes any plurality of combinations of items or any of a plurality of listed items.

Figure 2:
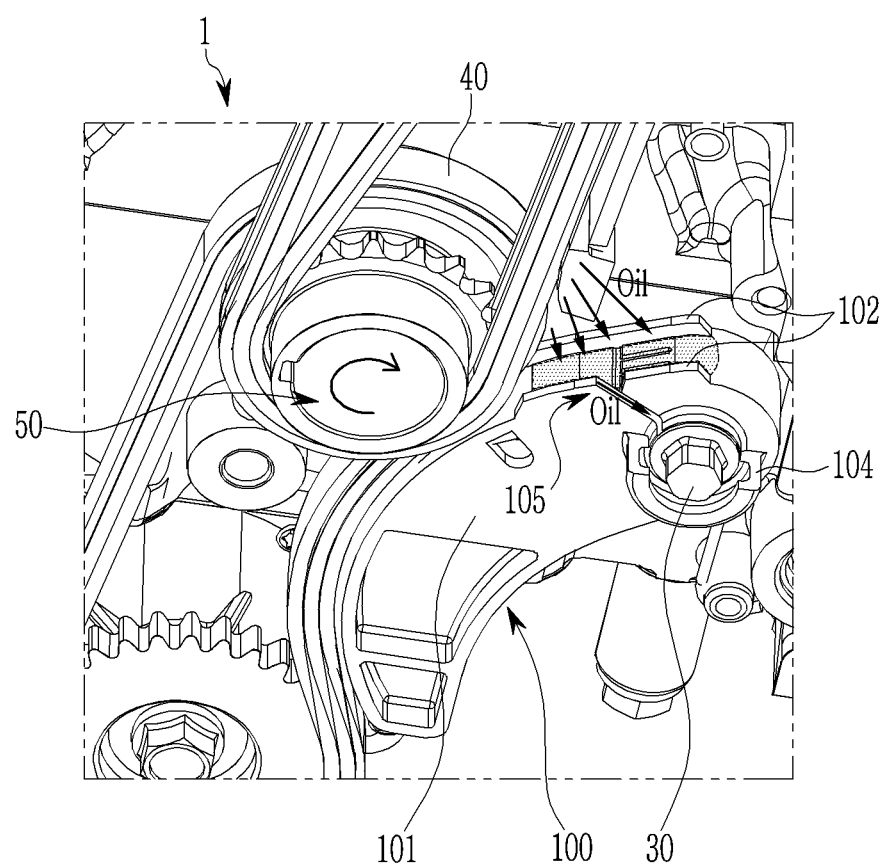
FIG. 2 is an enlarged view of a shape that oil is scattered to a chain tensioner according to various exemplary embodiments of the present disclosure.

FIG. 1 is a view showing inside of an engine to which a chain tensioner according to various exemplary embodiments of the present disclosure is applied, and FIG. 2 is an enlarged view of a shape in which oil is scattered to a chain tensioner according to various exemplary embodiments of the present disclosure.

Referring to FIG. 1 to FIG. 2, an oil pan 10 in which an engine oil is stored is provided in the lower part of engine 1. The hydraulic pump 20 is provided inside the oil pan 10, and the hydraulic pump 20 draws up the engine oil stored inside the oil pan 10 and pressurizes the engine oil to each component and peripheral auxiliary equipment of the engine 1 that require the lubrication. As an exemplary embodiment of the present disclosure, the engine oil stored in the oil pan 10 may lubricate a chain belt 40, a crankshaft 50, etc.

Referring to FIG. 1, it may be seen that one chain belt 40 that transmits the power of the crankshaft 50 to the peripheral auxiliary devices and transfers the engine oil is in contact with the chain tensioner 100. Examples of the peripheral auxiliary devices may be a plurality of cylinders, cams, etc., but are not limited thereto.

For example, the chain belt 40 may be one in which a plurality of chain assemblies are combined into one belt shape. The chain tensioner 100 may correspond to a mechanical chain tensioner using a torsion spring or the like.

The chain tensioner 100 includes a body portion 101 that applies tension to the chain belt 40 through a pivot. The body portion 101 presses the chain belt 40, which in turn applies the tension to the chain belt 40. A bolt 30 is engaged in the pivot journal 103, which is the center portion of the pivot of the body portion 101.

Therefore, the pivot journal 103 may have a hollow shape so that a thread (33; referring to FIG. 4) of the bolt 30 can be inserted. By combining the chain tensioner 100 to the engine 1 with the bolt 30 and simultaneously differentiating the tightening degree of the bolt 30, the magnitude of the tension applied to the chain belt 40 may be adjusted.

As an exemplary embodiment of the present disclosure, when the bolt 30 and the engine 1 are combined, the body portion 101 of the chain tensioner 100 between the bolt 30 and the engine 1 pivots around the pivot journal 103 toward the chain belt 40, pressing the chain belt 40. Therefore, the tension may be applied to the chain belt 40.

The engine oil supplied from the hydraulic pump 20 to the chain belt 40 lubricates the chain assemblies composing the chain belt 40 and is transported simultaneously along the chain belt 40 and is scattered toward the chain tensioner 100, and the scattering process of the engine oil is as follows.

As an exemplary embodiment of the present disclosure, FIG. 2 includes the chain belt 40 in orbital motion. The chain assemblies constituting one chain belt 40 ascend in the direction opposite to the direction of gravity, rotate in a clockwise direction around the crankshaft 50 at the highest point, and descend in the direction of gravity. When descending, the engine oil transported along with the chain belt 40 is scattered in the tangential direction of the rotational surface of the chain belt 40 due to the centrifugal force generated by the rotation, and the gravity is added here to it, resulting in a parabolic fall motion.

At the present time, the chain tensioner 100 is provided under the direction in which the engine oil is scattered. Therefore, the engine oil is scattered onto the upper surface 110 of the chain tensioner 100. The upper surface 110 of the chain tensioner 100 is one surface constituting the body portion 101, and may correspond to the surface on which the scattered engine oil falls on the chain tensioner 100. One of the technical features of the present disclosure is to add a lubrication force to the pivot of the chain tensioner 100 by use of the scattered engine oil.

Figure 3:
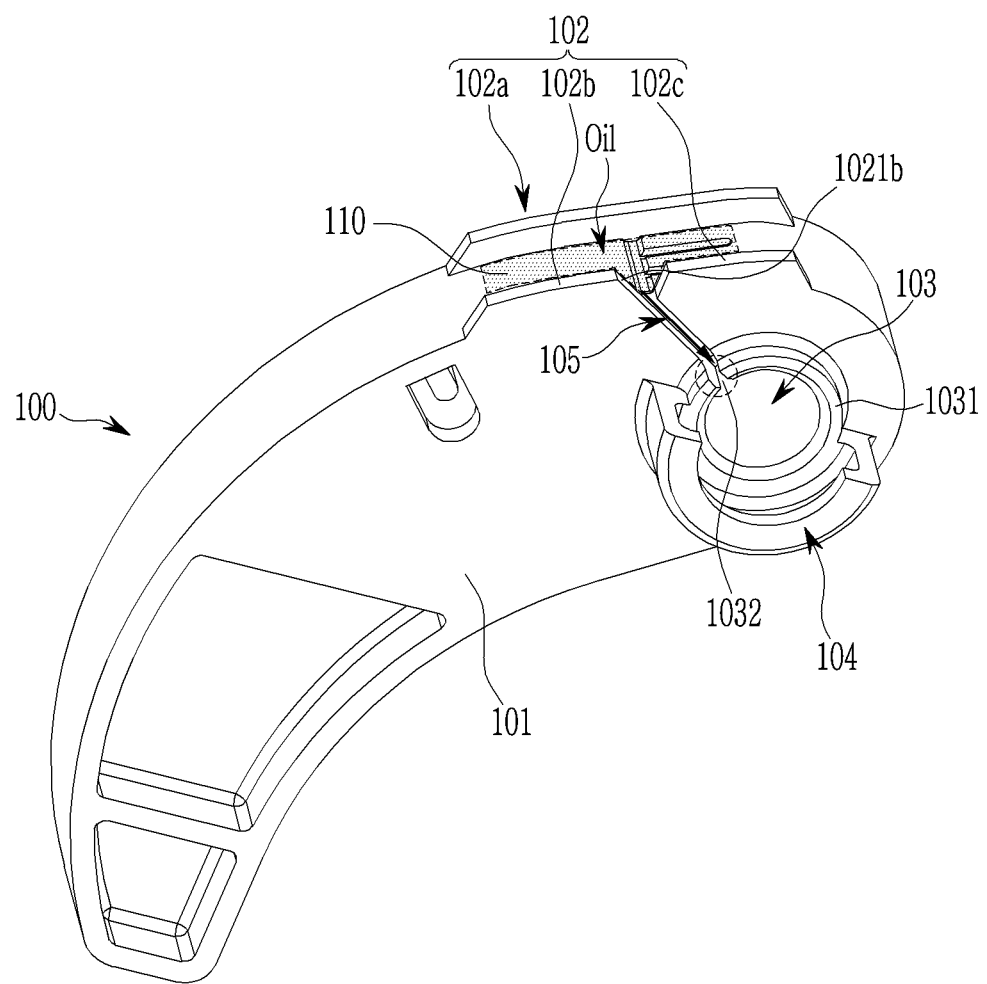
FIG. 3 is a perspective view of a structure of a chain tensioner according to various exemplary embodiments of the present disclosure.
Figure 4:
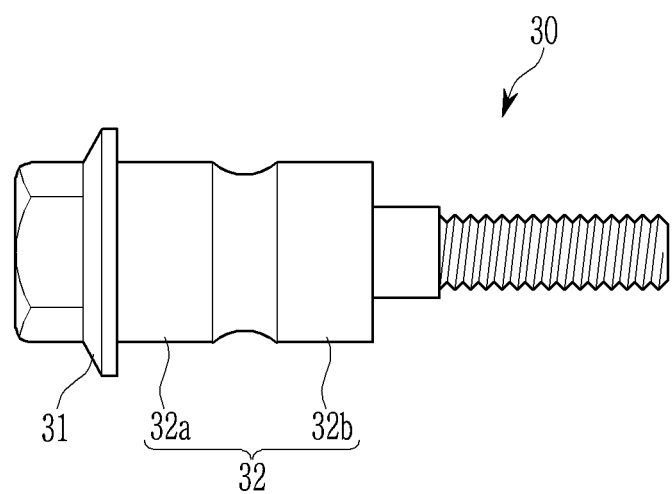
FIG. 4 is a view showing a structure of a bolt introduced into a pivot journal according to various exemplary embodiments of the present disclosure.
Figure 5:
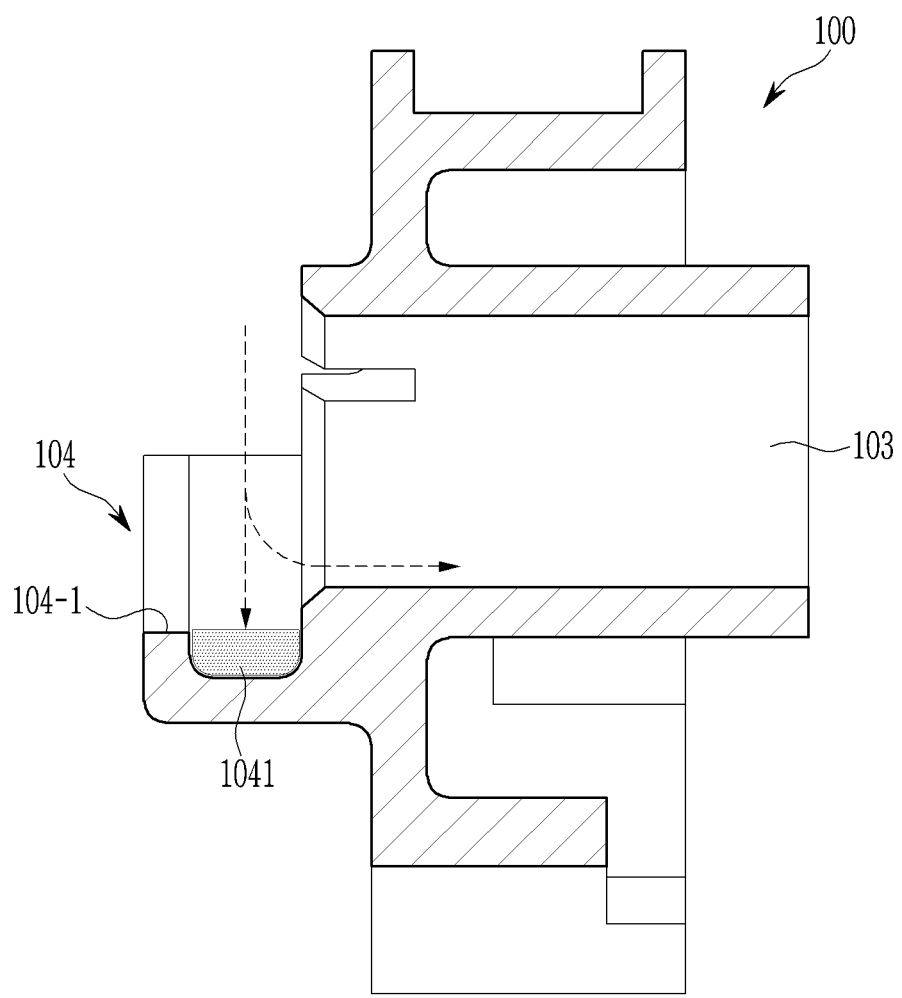
FIG. 5 is a cross-sectional view showing a state in which a chamber for preventing oil exhaust is provided in an oil collecting portion of a chain tensioner according to various exemplary embodiments of the present disclosure.
Figure 6:
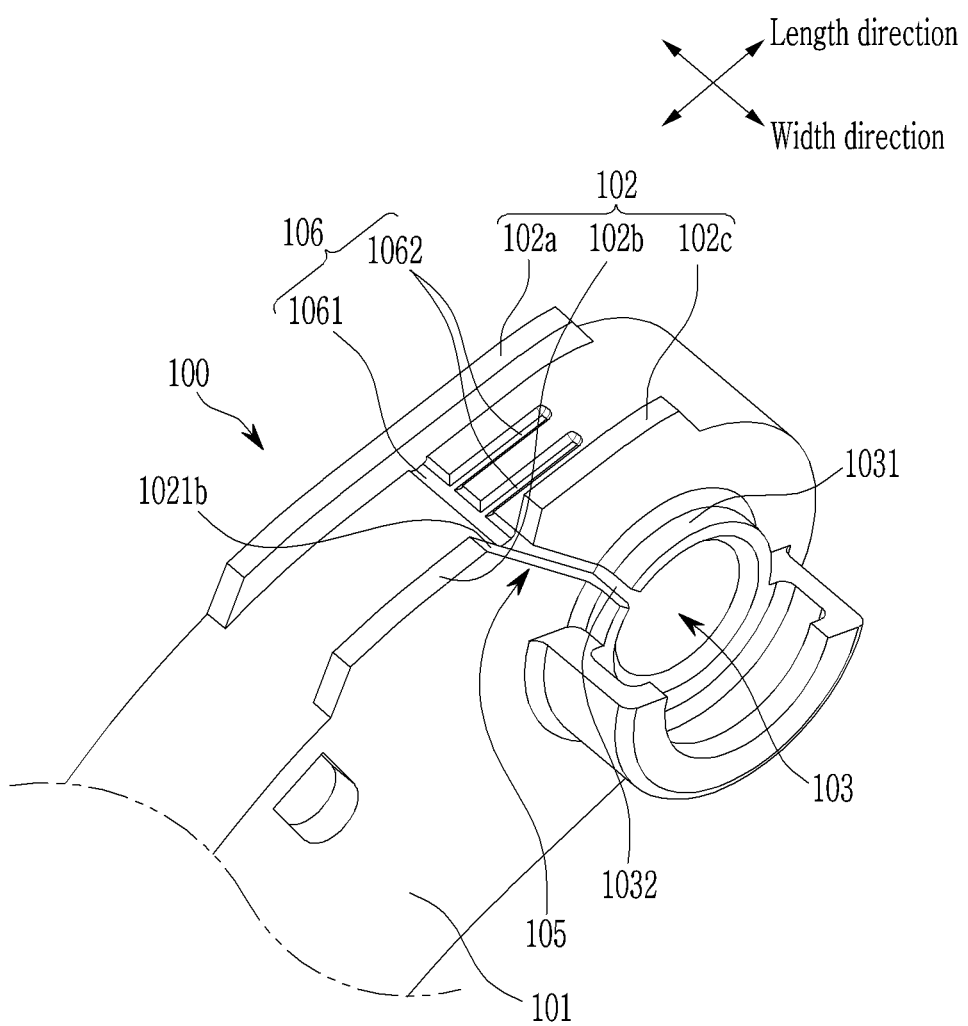
FIG. 6 is a perspective view showing a state in which a second oil flow path facilitating a flow of oil is provided on an upper surface of a chain tensioner according to various exemplary embodiments of the present disclosure.
Figure 7:
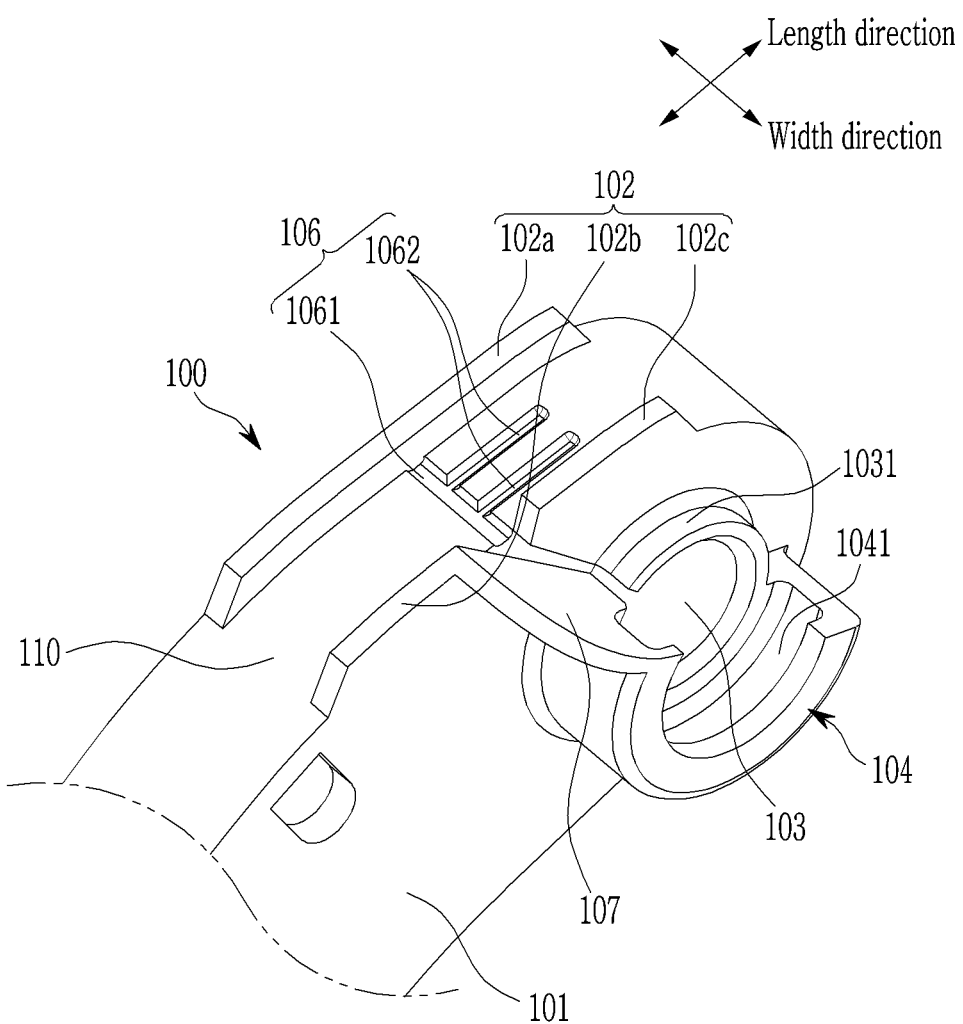
FIG. 7 is a perspective view showing a state in which an oil supply rib facilitating a flow of oil is provided to the chain tensioner according to various exemplary embodiments of the present disclosure.

FIG. 3 is a perspective view of a structure of a chain tensioner according to various exemplary embodiments of the present disclosure, FIG. 4 is a view showing a structure of a bolt introduced into a pivot journal according to various exemplary embodiments of the present disclosure, FIG. 5 is a cross-sectional view showing a state in which a chamber for preventing oil exhaust is provided in an oil collecting portion of a chain tensioner according to various exemplary embodiments of the present disclosure, FIG. 6 is a perspective view showing a state in which a second oil flow path facilitating flow of oil is provided on an upper surface of a chain tensioner according to various exemplary embodiments of the present disclosure, and FIG. 7 is a perspective view showing a state in which an oil supply rib facilitating a flow of an oil is provided to the chain tensioner according to various exemplary embodiments of the present disclosure.

Referring to FIG. 3, FIG. 3, FIG. 4, FIG. 5, FIG. 6, and FIG. 7, on the upper surface 110 of the chain tensioner 100, an oil guiding rib 102 may be formed to collect the engine oil scattered to the upper surface 110. The oil guiding rib 102 is a fence-shaped structure surrounding both sides of the upper surface 110, and a plurality of oil guiding rib 102 may be formed on the upper surface 110. The specific structure of the oil guiding rib 102 is described in detail later.

The bolt 30 penetrates one surface of the body portion 101 in contact with the upper surface 110, and a pivot journal 103 corresponding to the central axis of the pivot may be formed. A first oil flow path 105 is formed on one surface of the body portion 101 on which the pivot journal 103 is formed, and may be fluidically connected so that a fluid may flow from the upper surface 110 to the pivot journal 103. The first oil flow path 105 is configured to guide the engine oil collected on the upper surface 110 by the oil guiding rib 102 to flow down to the pivot journal 103. As an exemplary embodiment of the present disclosure, the first oil flow path 105 has a groove shape formed on one surface of the body portion 101, and the groove may be connected from the upper surface 110 to the pivot journal 103.

When the chain belt 40 is pressed by the pivot action of the chain tensioner 100, the pivot journal 103, which is the center portion of the pivot action, is repeatedly impacted by the reaction and additional vibration transmitted from the chain belt 40. Depending on the behavior of the chain belt 40, friction may also occur continuously with the pivot journal 103 and the bolt 30. At the instant time, the engine oil flowing down to the pivot journal 103 performs a lubrication action to reduce the friction between the pivot journal 103 and the bolt 30 penetrating the pivot journal 103.

However, if there is no structure in the chain tensioner 100 in which the engine oil flowing down to the pivot journal 103 may stay between the pivot journal 103 and the bolt 30 for a certain time period, the engine oil is inevitably exhausted to the outside of the chain tensioner 100 by gravity. Therefore, to help the lubrication action between the pivot journal 10 and the bolt 30, an oil collecting portion 104 may be additionally formed at the bottom portion of the pivot journal 103. The oil collecting portion 104 may be provided below the position where the first oil flow path 105 and the pivot journal 103 are connected within the body portion 101 based on the gravity direction.

As an exemplary embodiment of the present disclosure, the oil collecting portion 104 may be formed along the external circumference of the pivot journal 103. Therefore, the oil collecting portion 104 may be formed in a form that surrounds at least a part of the external circumference of the pivot journal 103.

The oil collecting portion 104 re-collects the engine oil that has flowed down to the pivot journal 103. That is, the engine oil flowing down to the pivot journal 103 does not immediately exhaust from the pivot journal 103. As an exemplary embodiment of the present disclosure, the oil collecting portion 104 may be formed in a form of a partial circle (e.g., a semicircle) along the external circumference of the pivot journal 103 at the lower end portion of the circular pivot journal 103 based on the gravity direction.

When describing the bolt 30 penetrating the pivot journal 103 in detail, the bolt includes a thread 33 coupled with the engine 1 after penetrating the pivot journal 103. It is self-evident that the engine 1 may also include a hole through which the screw thread 33 may be introduced.

Furthermore, when the bolt 30 penetrates the pivot journal 103, it may include at least one contact portion 32 in contact with the internal side of the pivot journal 103. As an exemplary embodiment of the present disclosure, the contact portion 32 may include a first contact portion 32a and a second contact portion 32b. Due to the pivot of the body portion 101, the contact portion 32 and the internal side of the pivot journal 103 in contact with the contact portion 32 are worn by frictional force, and by allowing the oil to enter the inside of the pivot journal 103 through the oil collecting portion 103, it is possible to reduce the friction between the pivot journal 103 and the contact portion 32.

In an exemplary embodiment of the present invention, the contact portion 32 may further include an oil groove 32c between the first contact portion 32a and the second contact portion 32b to receive oil supplied thereto through the first oil flow path 105.

Furthermore, when the bolt 30 penetrates the pivot journal 103, on the bolt 30, a head portion 31 which protrudes outward in the radial direction of the pivot journal 103 and partially surrounded by the oil collecting portion 104 may be formed.

Next, referring to FIG. 5, a chamber 1041 may be formed in the oil collecting portion 104. The chamber 1041 is formed in a concave shape on the surface 104-1 of the oil collecting portion 104.

Therefore, the chamber 1041 may form a lower step than the surface 104-1 of the oil collecting portion 104.

The chamber 1041 may provide a structure for storing the engine oil flowing down to the oil collecting portion 104. The engine oil stored in the chamber 1041 may maintain a long-term permeation state between the pivot journal 103 and the bolt 30 as long as it does not evaporate, so that the lubrication action between the pivot journal 103 and the bolt 30 may also last for a long time. Furthermore, the engine oil circulates because the scattered engine oil flows out of the oil collecting portion 104 after completely filling the chamber 1041.

Based on FIG. 5, the cross-section of the oil collecting portion 104 including the chamber 1041 may be formed in an approximately 'U' shape, and the internal surface of the oil collecting portion 104 adjacent to the pivot journal 103 may be communicated fluidly between the pivot journal 103 and the bolt 30. Accordingly, the engine oil collected in the oil collecting portion 104 may be continuously supplied between the pivot journal 103 and the bolt 30 through the internal surface of the oil collecting portion 104 adjacent to the pivot journal 103.

A journal rib 1031 that reduces a wear of the pivot journal 103 and the bolt 30 may be formed on the circumference of the pivot journal 103 during the pivot operation of the body portion 101. Through the journal rib 1031, it is possible to reduce the frictional force between the pivot journal 103 and the bolt 30 generated by the pivot action. As an exemplary embodiment of the present disclosure, the journal rib 1031 may be formed of a material which may minimize the friction with the metal material constituting the bolt 30.

A rib groove 1032 is formed in the journal rib 1031, and may be fluidly connected to the first oil flow path 105. Therefore, the oil flowing along the first oil flow path 105 may move smoothly to the pivot journal 103 through the rib groove 1032, and when the pivot journal 103 is rotated, acts as lubrication for the friction between the pivot journal 103 and the bolt 30.

Hereinafter, the structure of the upper surface 110 of the aforementioned body portion 101 is described in detail. As described above, the oil guiding rib 102 provided on the upper surface 110 of the body portion 101 may trap the scattered engine oil and simultaneously prevent the engine oil from flowing down from the upper surface 110 in an arbitrary direction. Furthermore, when the pivot journal 103 is formed on one surface of the body portion 101 in contact with the upper surface 110, the oil guiding rib 102 is configured to guide the oil to flow down to the pivot journal 103.

As an exemplary embodiment of the present disclosure, the oil guiding rib 102 may be formed by being protruded on the upper surface 110 to prevent the oil scattered on the upper surface 110 from being exhausted or scattered indiscriminately to the outside of the chain tensioner 100.

As an exemplary embodiment of the present disclosure, a plurality of oil guiding ribs 102 may be provided on the upper surface 110. As an exemplary embodiment of the present disclosure, the oil guiding rib 102 is formed on one end portion of the upper surface 110 to prevent the oil scattered on the upper surface 110 from being exhausted in an arbitrary direction. As another example, a plurality of oil guiding ribs 102 may be formed in a line on both end portions of the upper surface 110.

However, referring to FIG. 6 and FIG. 7, since the width of both edge portions formed in the width direction where the upper surface 110 is in contact with the other surface of the body portion 101 is relatively narrow compared to the width in the longitudinal direction of the upper surface 110, there is a high probability that the scattered oil will be exhausted in the width direction. Accordingly, the oil guiding rib 102 may be provided on the edge portion of the upper surface 110, and when a plurality of oil guiding ribs 102 are formed, at least a pair of oil guiding ribs 102 may be provided on the edge portion of the upper surface 110, respectively.

As an exemplary embodiment of the present disclosure, when three oil guiding ribs 102 are formed on the upper surface 110, the three oil guiding ribs 102 may include a first oil guiding rib 102a, a second oil guiding rib 102b, and a third oil guiding rib 102c. The first oil guiding rib 102a may be formed on one edge portion of 110 of the upper surface, and the second oil guiding rib 102b and the third oil guiding rib 102c may be formed on the other edge portion. The second oil guiding rib 102b and the third oil guiding rib 102c are implemented in a form facing the first oil guiding rib 102a, and may be provided in parallel, spaced from each other.

Referring to FIG. 5 and FIG. 6, a starting point of the first oil flow path 105 may be formed between a plurality of oil guiding ribs 102. As an exemplary embodiment of the present disclosure, among the edge portions of the upper surface 110, the oil guiding rib 102 provided on one edge portion in contact with one surface of the body portion 110 on which the first oil flow path 105 is formed may include the second guiding rib 102b and the third guiding rib 102c.

The second guiding rib 102b and the third guiding rib 102c are formed in a line, but may be positioned to form a predetermined interval and be spaced from each other. As the starting point of the first oil flow path 105 is formed in the spaced space, the oil may be supplied from the upper surface 110 to the pivot journal 103 and the bolt 30 through the first oil flow path 105.

A first slanted surface 1021b determining a slope of the first oil flow path 105 may be formed on one surface of a plurality of oil guiding ribs 102 on which the starting point of the first oil flow path 105 is formed. As an exemplary embodiment of the present disclosure, the first slanted surface 1021b that determines the slope of the first oil flow path 105 may be formed on the second guiding rib 102b facing the third guiding rib 102c.

Since the first oil flow path 105 may be formed from the groove between the third guiding rib 102c and the second guiding rib 102b, the first slanted surface 1021b made by the second guiding rib 102b which is connected to the pivot journal 103 may be the slope of the first oil flow path 105. The slope of the slanted surface is set by the designer within a predetermined range, but the designer may set the slope of the slanted surface so that the oil may flow smoothly to the pivot journal 103 along the slanted surface by considering the viscosity of the oil and the surface tension Referring to FIG. 7, among the plurality of oil guiding ribs 102, the oil supply rib 107 for smoothing the flow of the engine oil may be formed on at least one surface. As an exemplary embodiment of the present disclosure, the oil supply rib 107 that facilitates the flow of the oil may be formed on one surface of the second guiding rib 102b facing the third guiding rib 102c.

When the amount of the oil flowing through the first oil flow path 105 is large, the oil may be scattered from the first oil flow path 105 in an arbitrary direction and flow out of the body portion 101. Therefore, the oil supply rib 107 primarily is configured to guide the oil flowing to the first oil flow path 105.

As an exemplary embodiment of the present disclosure, since the oil supply rib 107 in the shape of a flat plate is formed on the second guiding rib 102b and is simultaneously in contact with one surface of the body portion 101 where the first oil flow path 105 is formed, the oil is guided in the direction of the pivot journal 103 and may be prevented from flowing out of the body portion 101. Furthermore, since the oil supply rib 107 is formed in the shape of the flat plate, the oil scattered to the outside of the third guiding rib 102c may also flow along the surface of the oil supply rib 107, and may enter the first oil flow path at 105 or be directly supplied to the pivot journal 103.

The oil supply rib 107 may be fluidly connected to the oil collecting portion 104 described above. As an exemplary embodiment of the present disclosure, the oil supply rib 107 may be integrally formed with the oil collecting portion 104. When the oil scattered to the surface of the oil supply rib 107 or a relatively large amount of the oil flows along the first oil flow path 105, since the oil scattered to the outside of the body portion 101 may flow down to the oil collecting portion 104 along the surface of the oil supply rib 107, the engine oil may be efficiently re-collected in the oil collecting portion 104.

Hereinafter, the second oil flow path 106 which is formed on the upper surface 110 and helps the flow of the engine oil scattered to the first oil flow path 105 is described in detail. When the scattered engine oil is scattered on the position where a relatively distance from the first oil flow path 105 exists within the upper surface 110, the second oil flow path 106 is configured to guide the scattered engine oil to the first oil flow path 105.

Referring to FIGS. 6 to 7, a second oil flow path 106 that guides the engine oil to the first oil flow path 105 may be formed on the upper surface 110 so that the engine oil collected on the upper surface 110 may flow smoothly to the starting point of the first oil flow path 105. The second oil flow path 106 may be directly connected to the first oil flow path 105.

The second oil flow path 106 may form a lower step with respect to the upper surface 110. In other words, the second oil flow path 106 may be formed concave to the upper surface 110. Accordingly, the engine oil collected on the upper surface 110 may flow to the second oil flow path 106. As an exemplary embodiment of the present disclosure, the second oil flow path 106 may be formed while forming a slanted surface toward the first oil flow path 105. Through the slanted surface, the engine oil may flow more smoothly into the first oil flow path 105.

The second oil flow path 106 may be formed in a plurality of grooves on the upper surface 110. A plurality of grooves are connected to the first oil flow path 105. As an exemplary embodiment of the present disclosure, the second oil flow path 106 may include a first groove 1061 connected to the first oil flow path 105 to guide the flow of the oil to the first oil flow path 105, and a second groove 1062 fluidly connected to the first groove 1061 to guide the flow of the oil to the first groove 1061.

As an exemplary embodiment of the present disclosure, when the starting point of the first oil flow path 105 is formed between the second guiding rib 102b and the third guiding rib 102c, the first groove 1061 may be formed in the width direction of the upper surface 110 and be connected to the starting point of the first oil flow path 105. Also, in the case of the second groove 1062, it may be formed in the longitudinal direction of the upper surface 110 and be connected to the first groove 1061.

However, to prevent the engine oil from flowing smoothly from the upper surface 10 to the first oil flow path 105 due to the engine oil's own viscosity, the second groove 1062 may form a lower step based on the upper surface 110, and the first groove 1061 may form a lower step than the second groove 1062. Furthermore, since the first groove 1061 may form a slanted surface facing the first oil flow path 105, and the second groove 1062 may form a slanted surface facing the first groove 1061, overall, the flow of the engine oil to the first oil flow path 105 may be smoothly induced.

In summary, the chain tensioner 100 according to an exemplary embodiment of the present disclosure improves the lubrication of the pivot journal 103, which is the center of the pivot operation as the arm bolt 30 is engaged, reducing the friction with the bolt 30 during the pivot operation of the pivot journal 103 and then producing an effect of improving the wear of the pivot journal 103 or the arm bolt 30. Therefore, the user may use the chain tensioner 100 for a long time without repair and replacement.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain predetermined principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A chain tensioner apparatus that applies a tension to a chain belt and guides the chain belt that transports engine oil, the chain tensioner apparatus comprising:
 a body portion that includes an upper surface, at least a part thereof being in contact with the chain belt to apply the tension to the chain belt, and first and second side surfaces connected to the upper surface and facing each other;

a pivot journal penetrating the body portion; and a bolt penetrating the pivot journal to pivot the body portion with respect to an engine, wherein at least a part of the engine oil transported by the chain belt is scattered on the upper surface of the body portion, and wherein at least one of the first and second side surfaces is formed with a first oil flow path that guides the at least a part of the engine oil scattered on the upper surface of the body portion to the pivot journal, wherein an oil collecting portion, that surrounds a lower part of the pivot journal and re-collects the at least a part of the engine oil, is formed on the first side surface where the first oil flow path is formed, and wherein the bolt includes:
  a screw thread which is engaged with a body of the engine,
  at least one contact portion in contact with an inside of the pivot journal when penetrating the pivot journal, and
  a head portion protruded outward in a radial direction of the pivot journal and having at least a part surrounded by the oil collecting portion.

2. The chain tensioner apparatus of claim 1, wherein an oil guiding rib, that collects the at least a part of the engine oil scattered from the chain belt onto the upper surface protrudes upward from the upper surface of the body portion.

3. The chain tensioner apparatus of claim 2, wherein the oil guiding rib is provided on at least one end of the upper surface of the body portion.

4. The chain tensioner apparatus of claim 3, wherein the oil guiding rib is in plural to include:
  a first oil guiding rib and a second oil guiding rib spaced from each other at first and second ends of the upper surface of the body portion.

5. The chain tensioner apparatus of claim 4, wherein a starting point of the first oil flow path is formed between the first oil guiding rib and the second oil guiding rib.

6. The chain tensioner apparatus of claim 5, wherein at least one of opposite surfaces of the first oil guiding rib and the second oil guiding rib is formed to be inclined toward the pivot journal to form the first oil flow path.

7. The chain tensioner apparatus of claim 4, wherein the oil guiding rib further includes an additional oil supply rib formed on one surface of one of the first and second oil guiding ribs, to facilitate flow the at least a part of the engine oil.

8. The chain tensioner apparatus of claim 7, wherein the additional oil supply rib is fluidly connected to the oil collecting portion that surrounds the lower part of the pivot journal and re-collects the at least a part of the engine oil.

9. The chain tensioner apparatus of claim 1, wherein the at least one contact portion of the bolt includes:
  a first contact portion and a second contact portion; and
  an oil groove between the first contact portion and the second contact portion to receive the at least a part of the engine oil supplied thereto through the first oil flow path.

10. The chain tensioner apparatus of claim 1, wherein a chamber for storing the re-collected engine oil is formed in the oil collecting portion.

11. The chain tensioner apparatus of claim 1,
  wherein a journal rib is formed on a circumference of the pivot journal, and
  wherein a rib groove is formed in the journal rib and is fluidly connected to the first oil flow path.

12. The chain tensioner apparatus of claim 1, wherein a second oil flow path guiding the at least a part of the engine oil to the first oil flow path is formed on the upper surface of the body portion, and the second oil flow path is fluidly connected to the first oil flow path.

13. The chain tensioner apparatus of claim 12, wherein the second oil flow path is formed with a slanted surface facing the first oil flow path.

14. The chain tensioner apparatus of claim 12, wherein the second oil flow path includes:
  a first groove guiding flow of the at least a part of the engine oil to the first oil flow path; and
  a second groove which is fluidly connected to the first groove and induces the flow of the at least a part of the engine oil into the first groove.

15. The chain tensioner apparatus of claim 14, wherein the second groove forms a lower step than a top surface of the body portion, and the first groove forms a lower step than the second groove.

16. The chain tensioner apparatus of claim 15, wherein the first groove is formed with a slanted surface facing the first oil flow path, and the second groove is formed with a slanted surface facing the first groove.

17. The chain tensioner apparatus of claim 14, wherein the second groove is formed in a longitudinal direction of the upper surface with a predetermined length.

18. The chain tensioner apparatus of claim 17, further including a first oil guiding rib and a second oil guiding rib spaced from each other at first and second ends of the upper surface of the body portion and protruding upward from the upper surface of the body portion,
  wherein the second groove is formed between the first oil guiding rib and the second oil guiding rib to collect the at least a part of the engine oil scattered from the chain belt onto the upper surface of the body portion.

* * * * *